US012812047B2

(12) United States Patent
Kinoshita et al.

(10) Patent No.: US 12,812,047 B2
(45) Date of Patent: Nov. 24, 2026

(54) IMAGE PROCESSING SYSTEM, IMAGE PROCESSING METHOD, AND NON-TRANSITORY COMPUTER READABLE MEDIUM FOR RECORDING PREVIEW IMAGE DATA

(71) Applicant: FUJIFILM Business Innovation Corp., Tokyo (JP)

(72) Inventors: Tomoki Kinoshita, Kanagawa (JP); Takeshi Kaneko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/488,150

(22) Filed: Oct. 17, 2023

(65) Prior Publication Data

US 2024/0348730 A1 Oct. 17, 2024

(30) Foreign Application Priority Data

Apr. 13, 2023 (JP) ................................ 2023-065396

(51) Int. Cl.

| | |
|---|---|
| ***H04N 1/00*** | (2006.01) |
| ***G06T 7/00*** | (2017.01) |
| ***H04N 1/12*** | (2006.01) |

(52) U.S. Cl.

CPC ......... *H04N 1/0044* (2013.01); *G06T 7/0002* (2013.01); *H04N 1/00689* (2013.01); *H04N 1/00766* (2013.01); *H04N 1/125* (2013.01); *G06T 2207/30168* (2013.01); *G06T 2207/30176* (2013.01)

(58) Field of Classification Search

CPC ............. H04N 1/0044; H04N 1/00689; H04N 1/00766; H04N 1/125; G06T 7/0002; G06T 2207/30176

See application file for complete search history.

(56) References Cited

U.S. PATENT DOCUMENTS

| | | | | |
|---|---|---|---|---|
| 2008/0079980 A1* | 4/2008 | Matsubara | ......... | G03G 15/5012 358/1.14 |
| 2009/0116081 A1* | 5/2009 | Kasai | ................. | H04N 1/00591 382/199 |
| 2009/0231633 A1* | 9/2009 | Matsuda | .................. | H04N 1/40 358/448 |
| 2012/0050800 A1* | 3/2012 | Maruyama | ......... | H04N 1/00456 358/1.15 |
| 2018/0091658 A1* | 3/2018 | Tsunekawa | .......... | H04N 1/0044 |

FOREIGN PATENT DOCUMENTS

| | | |
|---|---|---|
| JP | 2015-050475 A | 3/2015 |

* cited by examiner

*Primary Examiner* — Juan M Guillermety
(74) *Attorney, Agent, or Firm* — Oliff PLC

(57) ABSTRACT

An image processing system includes one or more processors configured to: in an operation mode of causing a display device to display, for preview, image data acquired by scanning in a first document during transport by a transport mechanism, while the first document is previewed, save the image data being displayed for preview to a recording medium in response to detection of a document feeder of the transport mechanism being loaded with a second document.

13 Claims, 8 Drawing Sheets

IMAGE PROCESSING SYSTEM, IMAGE PROCESSING METHOD, AND NON-TRANSITORY COMPUTER READABLE MEDIUM FOR RECORDING PREVIEW IMAGE DATA

CROSS-REFERENCE TO RELATED APPLICATIONS

This application is based on and claims priority under 35 USC 119 from Japanese Patent Application No. 2023-065396 filed Apr. 13, 2023.

BACKGROUND

(i) Technical Field

The present disclosure relates to an image processing system, an image processing method, and a non-transitory computer readable medium.

(ii) Related Art

Examples of an apparatus configured to acquire image data from a document during transport include an apparatus having an operation mode of displaying image data for preview before saving the image data. In such an operation mode, saving the image data is suspended until a user operates a button. Japanese Unexamined Patent Application Publication No. 2015-050475 is an example of related art.

SUMMARY

Users sometimes need to consecutively scan in multiple documents to acquire image data. The term "multiple documents" indicates that a scanning block includes multiple documents. A scanning block may include one document or multiple documents.

When acquired image data is displayed for preview, a user needs to perform the same operation to consecutively scan in multiple documents as to scan in a single document. Specifically, the user needs to operate a button to save image data being displayed for preview. Unless the user operates the button, no image data being displayed for preview is saved, and scanning in the next document to acquire image data does not begin.

Aspects of non-limiting embodiments of the present disclosure relate to achieving consecutive scanning in of multiple documents with a smaller number of operations by the user than in a case where the user needs to operate a button to save image data being displayed for preview.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including: one or more processors configured to: in an operation mode of causing a display device to display, for preview, image data acquired by scanning in a first document during transport by a transport mechanism, while the first document is previewed, save the image data being displayed for preview to a recording medium in response to detection of a document feeder of the transport mechanism being loaded with a second document.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to the drawings.

First Exemplary Embodiment

System Configuration

Figure 1:
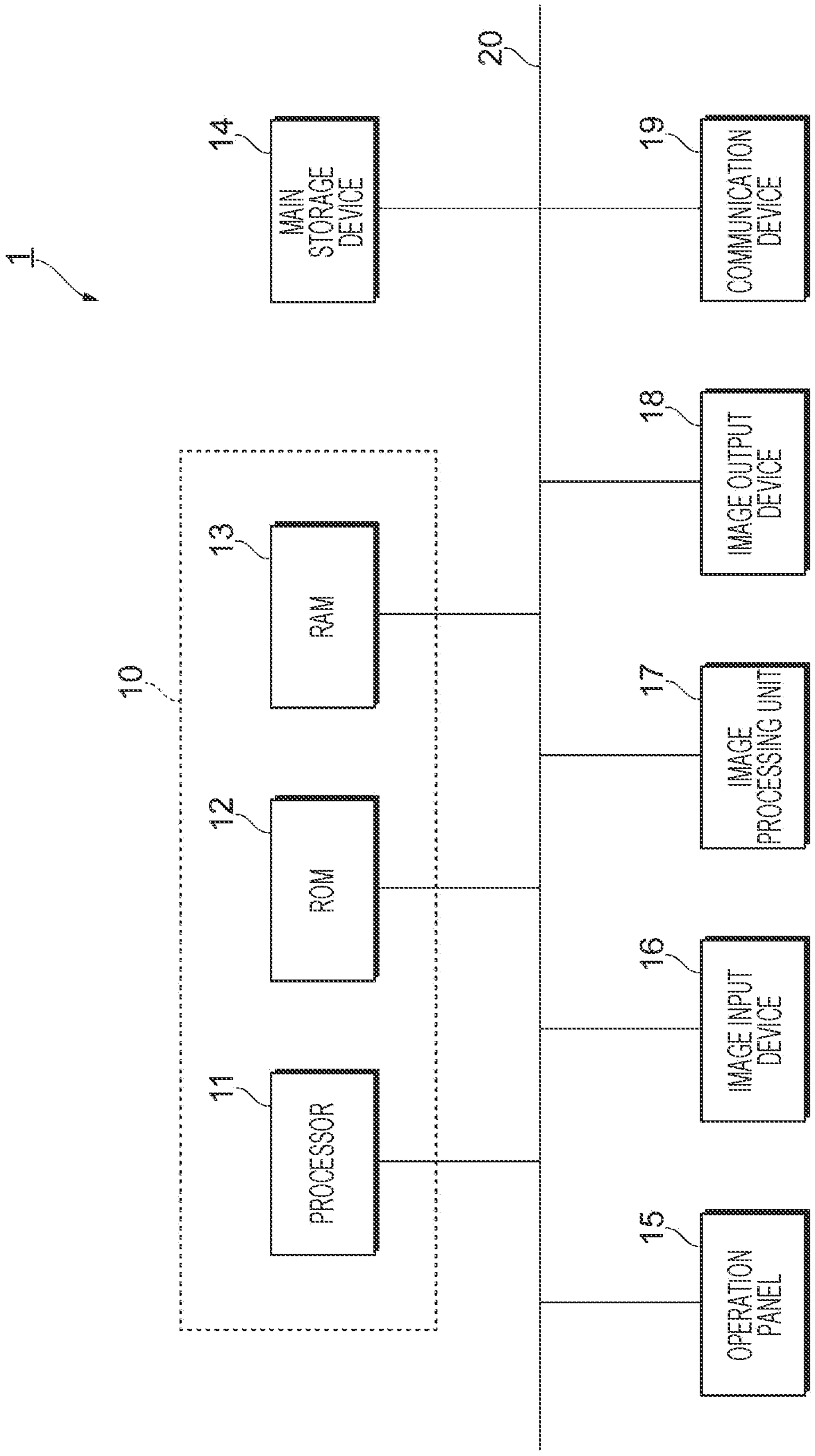
FIG. 1 depicts an example of a functional configuration of an image processing system according to a first exemplary embodiment.

FIG. 1 depicts an example of a functional configuration of an image processing system 1 according to a first exemplary embodiment.

The image processing system 1 according to the first exemplary embodiment has a print function, a scan function, and a copy function. The copy function causes the print function to print, on a sheet, an image acquired by the scan function.

The image processing system 1 according to the first exemplary embodiment includes a controller 10 configured to control the entire system, a main storage device 14 configured to store images to be processed and operation screens, an operation panel 15 used to display operation screens and accept user operations, an image input device 16 configured to optically scan in document images, an image processing unit 17 configured to perform predetermined processing on image data to be processed, an image output device 18 configured to form an image on a sheet as a recording medium, and a communication device 19 used to communicate with external apparatuses. The controller 10 is connected to the other devices using a signal line 20, such as a bus line connecting each device.

The controller 10 is formed of a processor 11 configured to execute programs, a read only memory (ROM) 12 configured to store programs, such as a basic input/output system (BIOS) and firmware, and data, and a random access memory (RAM) 13 used as a work area for the programs. The controller 10 operates as a so-called computer.

The main storage device 14 is formed of, for example, a hard disk device or a semiconductor memory. The hard disk device and the semiconductor memory are examples of a recording medium.

The operation panel 15 is formed of, for example, a touch panel and hardware components such as a button and a switch.

The touch panel is formed of, for example, a display device and a film sensor of electrostatic capacitance type. The film sensor of electrostatic capacitance type is formed of a highly transparent material allowing the visibility of the display device and is attached to the display surface of the display device. The display device is formed of, for example, a liquid crystal display or an organic electroluminescence (EL) display.

The image input device 16 is a so-called scanner. The image input device 16 according to the present exemplary embodiment includes a transport mechanism, an illuminating light source, and an image sensor; the transport mechanism, such as a transport roller, is configured to transport a document placed in or on a document tray; the image sensor is configured to scan in a document during transport to acquire image data.

The illuminating light source is configured to illuminate a document during transport with a line-shaped illuminating light beam. In the present exemplary embodiment, the position illuminated with the illuminating light beam is referred to as a scanning position. The scanning position in the present exemplary embodiment is fixed.

Examples of the image sensor to be used include a charge coupled device (CCD) and a contact image sensor (CIS). The image input device 16 according to the present exemplary embodiment supports, for example, all of the full color format, the gray scale format, and the black-and-white format as the output format of image data acquired from a scanned document.

The image input device 16 according to the present exemplary embodiment scans in a document sheet by sheet. Specifically, the image input device 16 displays or saves image data every time image data is acquired by scanning in one-sheet document.

The image processing unit 17 is configured to perform preprocessing including, for example, level correction and processing for improving image quality. Examples of the processing related to image quality include density, sharpness, contrast, and ground color removal.

The image output device 18 is configured to print images on the surfaces of rolled paper or a cut sheet using, for example, an electrophotographic system or an inkjet system. In the present exemplary embodiment, it is assumed that cut sheets of A0, A1, A2, A3, and A4 sizes and rolled paper having a predetermined width and diameter are used. The width and length of a sheet to be manually fed is determined in advance. The size of a sheet is not limited to the above examples.

The communication device 19 is configured to communicate with external apparatuses, such as a server, a computer, and a storage device, connected to the network, for example, via an Ethernet (registered trademark) network.

Processing Operation

Figure 2:
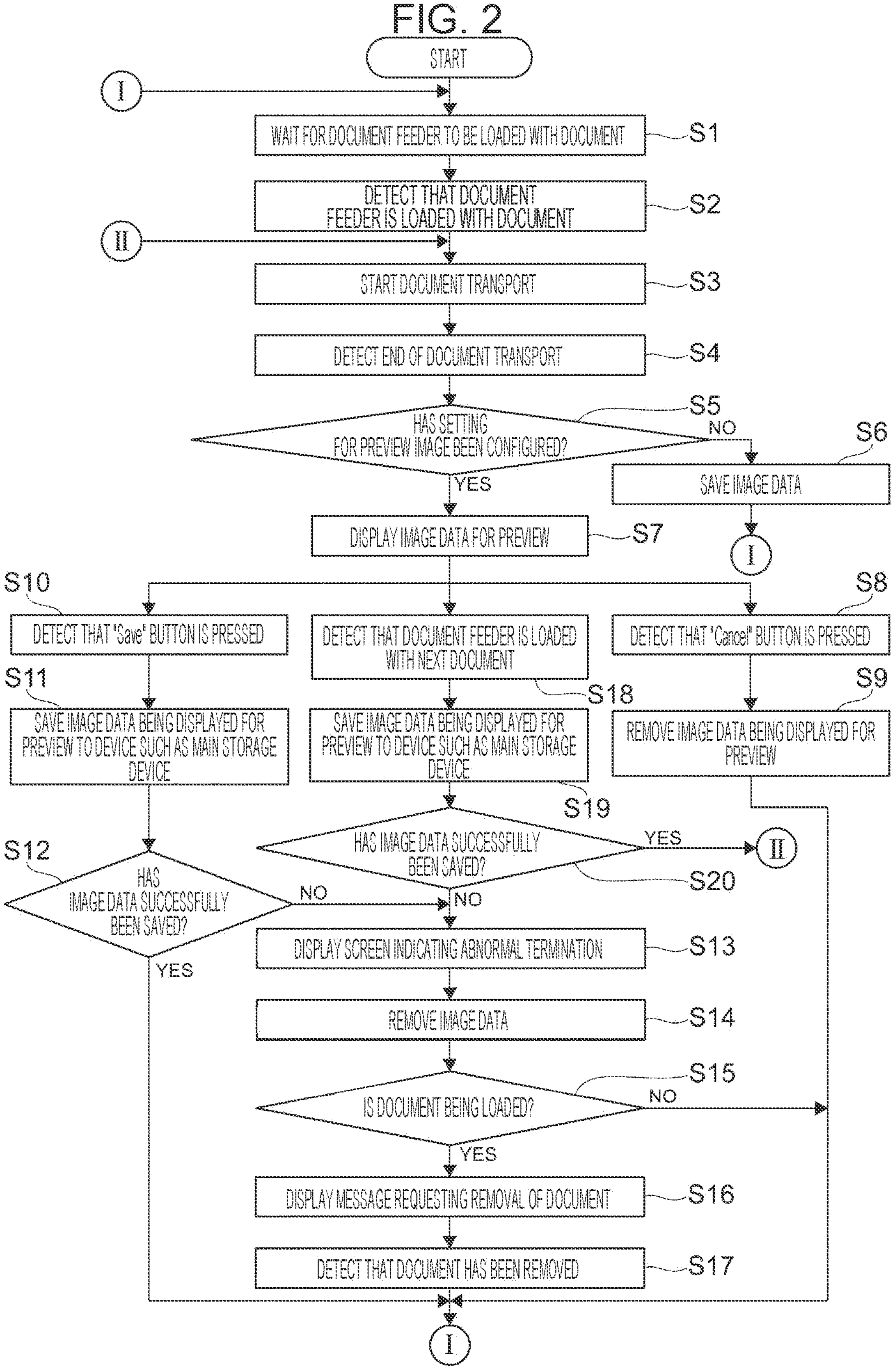
FIG. 2 is a flowchart for describing a processing operation of a scan function performed by the image processing system according to the first exemplary embodiment.

FIG. 2 is a flowchart for describing a processing operation of the scan function performed by the image processing system 1 according to the first exemplary embodiment. The character "S" in FIG. 2 represents a step.

The processing operation depicted in FIG. 2 is performed by the execution of programs by the processor 11 (refer to FIG. 1). The processing operation depicted in FIG. 2 is started by an instruction to perform the scan function; the instruction is provided using an operation screen displayed by the operation panel 15 (refer to FIG. 1).

Image data acquired from a document by the scan function may be stored not only in the main storage device 14 (refer to FIG. 1) but also in external apparatuses connected to the network, such as a server, a computer, and a storage device.

The processor 11 is configured to accept, via the operation screen of the operation panel 15, settings including a setting regarding the adjustment of image quality, a setting regarding a scanning method, and a setting for a preview image.

After accepting these settings, the processor 11 waits for the document feeder (not depicted) built in the image input device 16 (refer to FIG. 1) to be loaded with a document (step 1). In other words, the processor 11 waits for a document to be inserted into the document feeder of the transport mechanism built in the image input device 16. In the present exemplary embodiment, the document has one sheet, and the user manually loads the document feeder with the document. Document loading is detected by a sensor disposed deep into the document feeder.

Next, the processor 11 detects that the document feeder is loaded with a document (step 2).

On detecting that a document is loaded, the processor 11 starts document transport (step 3). Namely, the document starts to be scanned in.

The document is transported by a transport roller not depicted. The transport may begin in response to a "Start" button being pressed or the detection by the sensor of a document being loaded. The "Start" button may be provided as a hardware button or a software button in an operation screen.

Next, the processor 11 detects the end of document transport (step 4). The end of document transport is detected, for example, when the trailing end of the document moves past the scanning position. However, the end of document transport may be detected when the document is discharged from the discharge port.

Subsequently, the processor 11 determines whether the setting for a preview image has been configured (step 5). If the setting for a preview image has not been configured, a negative determination is made in step 5. In such a case, the processor 11 saves the image data (step 6) and returns to step 1.

In contrast, if the setting for a preview image has been configured, an affirmative determination is made in step 5. In such a case, the processor 11 displays image data for preview (step 7). A preview image is displayed by the operation panel 15.

Figure 3:
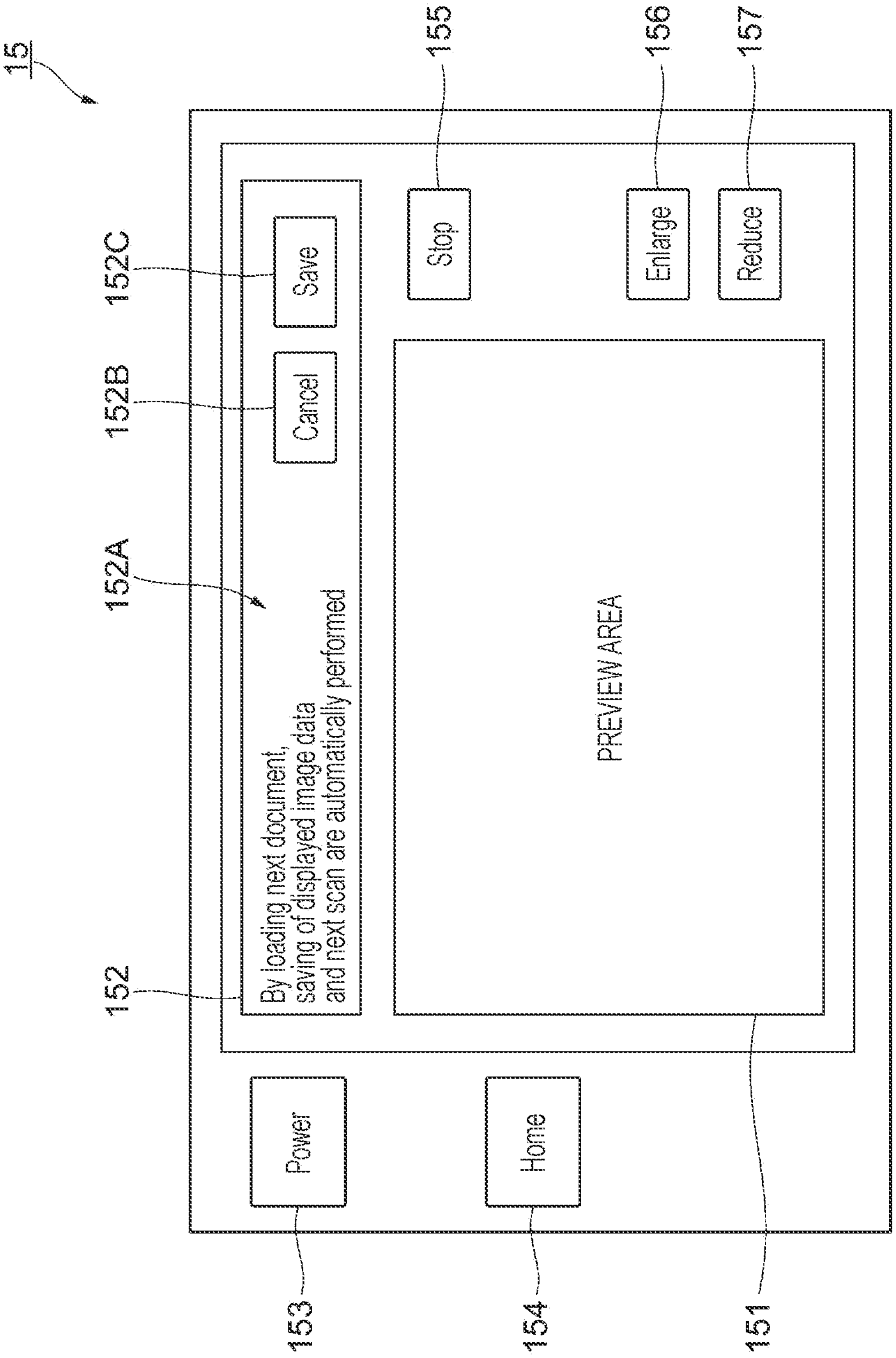
FIG. 3 depicts an example of a preview image used in the first exemplary embodiment.

FIG. 3 illustrates an example of the preview image used in the first exemplary embodiment. In the present exemplary embodiment, the operation screen depicted in FIG. 3 is displayed by the operation panel 15.

The operation screen includes a preview area 151, a message area 152, and buttons 153, 154, 155, 156, and 157 for various operations.

An image acquired by scanning in a document is displayed in the preview area 151.

In FIG. 3, the message area 152 contains a guidance message 152A, a "Cancel" button 152B, and a "Save" button 152C.

The guidance message 152A contains a description notifying the user of operations that may be performed while a preview image is being displayed. In FIG. 3, the guidance message 152A reads "By loading next document, saving of displayed image data and next scan are automatically performed".

The guidance message 152A indicates that loading the document feeder with the next document (that is, a new document) has two functions. Specifically, the guidance message 152A indicates that loading the document feeder with the next document has a function of pressing the "Save" button 152C and a function of pressing, for example, the "Start" button.

Displaying the guidance message 152A may inform a user who is not used to operating the image processing system 1 that loading the document feeder with the next document dispenses with instructions to save image data and to start a scan.

However, the message area 152 depicted in FIG. 3 also contains the "Save" button 152C. Thus, the user may also instruct the processor 11 (refer to FIG. 1) to save image data being displayed for preview by pressing the "Save" button 152C. In summary, by using the operation screen depicted in FIG. 3, the user may instruct the processor 11 to save image data by pressing the "Save" button 152C or by loading the document feeder with the next document.

Additionally, the message area 152 also contains the "Cancel" button 152B. The "Cancel" button 152B is provided to redo a document scan for acquiring image data or abort a document scan.

A power button 153 is used to power off as well as to switch to the power saving mode and return from the power saving mode.

A home button 154 is used to open the home screen.

A "Stop" button 155 is used to stop the scan function.

An "Enlarge" button 156 is used to enlarge the image displayed in the preview area 151.

A "Reduce" button 157 is used to reduce in size the image displayed in the preview area 151.

Referring back to FIG. 2, more description will be given.

The processor 11 is configured to perform the following processing operations in response to a button operation accepted via the operation screen.

For example, on detecting that the "Cancel" button 152B (refer to FIG. 3) is pressed (step 8), the processor 11 removes the image data being displayed for preview (step 9) and returns to step 1.

For example, on detecting that the "Save" button 152C (refer to FIG. 3) is pressed (step 10), the processor 11 saves the image data being displayed for preview to a device such as the main storage device 14 (refer to FIG. 1) (step 11). Subsequently, the processor 11 determines whether the image data has successfully been saved (step 12).

If the image data has successfully been saved, an affirmative determination is made in step 12. In such a case, the processor 11 returns to step 1.

In contrast, if the image data has not successfully been saved, a negative determination is made in step 12. Examples of the reason for failing to successfully save image data include a case where the main storage device 14 (refer to FIG. 1) becomes filled to capacity while the image data is being saved, a case where the image data exceeds the limit in data size, and a case where the external apparatus designated as the destination location for saving the image data is not available for communication.

If a negative determination is made in step 12, the processor 11 displays a screen indicating abnormal termination (referred to as "abnormal termination screen" below) (step 13).

Figure 4:
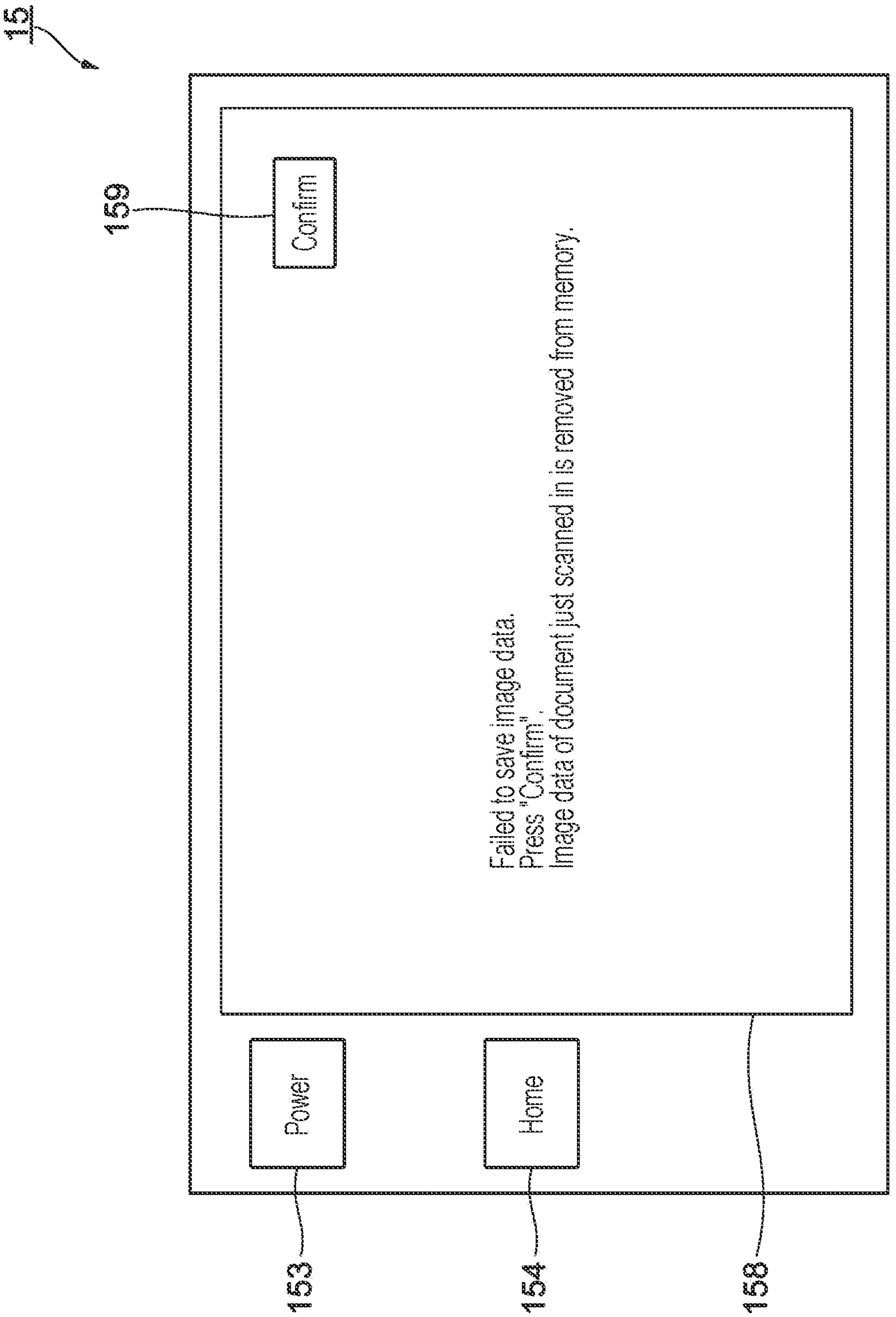
FIG. 4 depicts an example of a screen of abnormal termination.

FIG. 4 depicts an example of the abnormal termination screen. Each component in FIG. 4 having a corresponding component in FIG. 3 is denoted by the same numeral as in FIG. 3.

The operation screen depicted in FIG. 4 contains the power button 153, the home button 154, an error-message area 158, and a "Confirm" button 159.

In FIG. 4, the error-message area 158 contains three sentences, "Failed to save image data.", "Press 'Confirm'.", and "Image data of document just scanned in is removed from memory."

The content displayed in the error-message area 158 informs the user that the user needs to scan in the document again to acquire image data.

Referring back to FIG. 2, more description will be given.

If the user presses the "Confirm" button 159 (refer to FIG. 4), the processor 11 removes the image data (step 14).

Subsequently, the processor 11 determines whether the document is being loaded (step 15). In other words, the processor 11 determines whether the document remains on the transport path.

If no document remains on the transport path, a negative determination is made in step 15. In such a case, the processor 11 returns to step 1.

In contrast, if the document remains on the transport path, an affirmative determination is made in step 15. In such a case, the processor 11 displays a message requesting the removal of the document (step 16). Subsequently, on detecting that the document has been removed (step 17), the processor 11 returns to step 1.

Finally, description will be given with regard to a case where the user loads the document feeder with the next document without pressing the "Save" button 152C (refer to FIG. 3).

On detecting that the document feeder is loaded with the next document (step 18), the processor 11 saves the image data being displayed for preview to a device such as the main storage device 14 (refer to FIG. 1) (step 19). In other words, the processor 11 saves the image data to a device such as the main storage device 14 (refer to FIG. 1) in response to the detection of the next document (that is, a new document) being loaded.

Subsequently, the processor 11 determines whether the image data has successfully been saved (step 20).

If the image data has successfully been saved, an affirmative determination is made in step 20. In such a case, the processor 11 returns to step 3. In other words, the processor 11 starts to transport the next document, which is newly loaded, without the "Start" button being pressed by the user.

Subsequently, on detecting the end of document transport (step 4), based on the setting for a preview image, the processor 11 displays, for preview, the image data acquired by scanning in the new document (steps 5 and 7).

Specifically, if the settings configured to scan in the immediately preceding document includes the setting for a preview image, the processor 11 also displays newly acquired image data for preview.

If the image data has not successfully been saved, a negative determination is made in step 20. In such a case, the processor 11 transitions to step 13, which is described above.

Second Exemplary Embodiment

In the present exemplary embodiment, description will be given with regard to a case where the operation screen does not contain the "Save" button 152C (refer to FIG. 3) or the setting has disabled the display of the "Save" button 152C.

Figure 5:
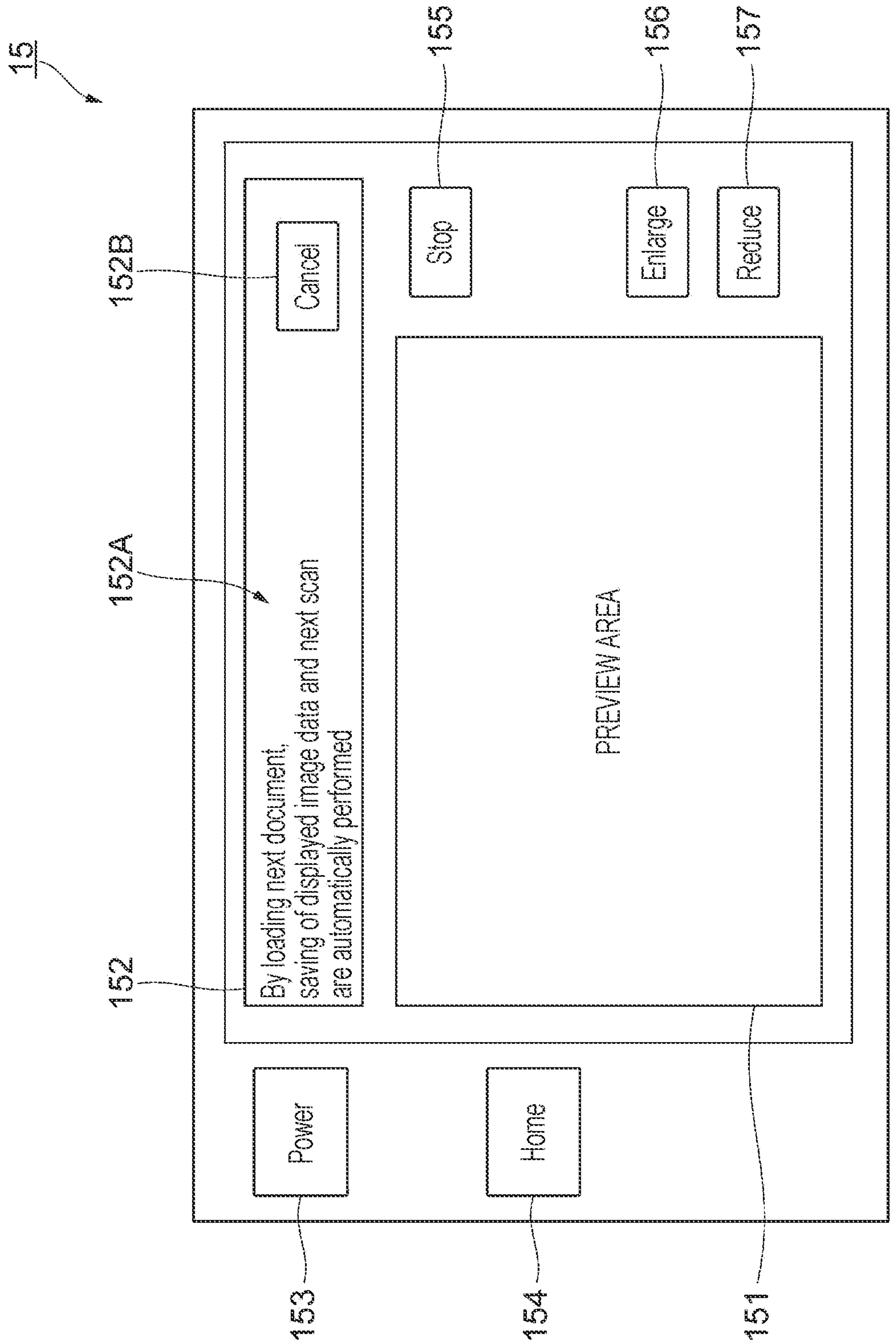
FIG. 5 depicts an example of a preview image used in a second exemplary embodiment.

FIG. 5 illustrates an example of a preview image used in a second exemplary embodiment. Each component in FIG. 5 having a corresponding component in FIG. 3 is denoted by the same numeral as in FIG. 3.

The message area 152 depicted in FIG. 5 contains the guidance message 152A and the "Cancel" button 152B and does not contain the "Save" button 152C.

The guidance message 152A reads the same as the guidance message in FIG. 3.

In the present exemplary embodiment, a user who wants to consecutively scan in documents to acquire image data is allowed to scan in the next document to acquire image data only by loading the document feeder with the next document while an image is being displayed for preview.

Figure 6:
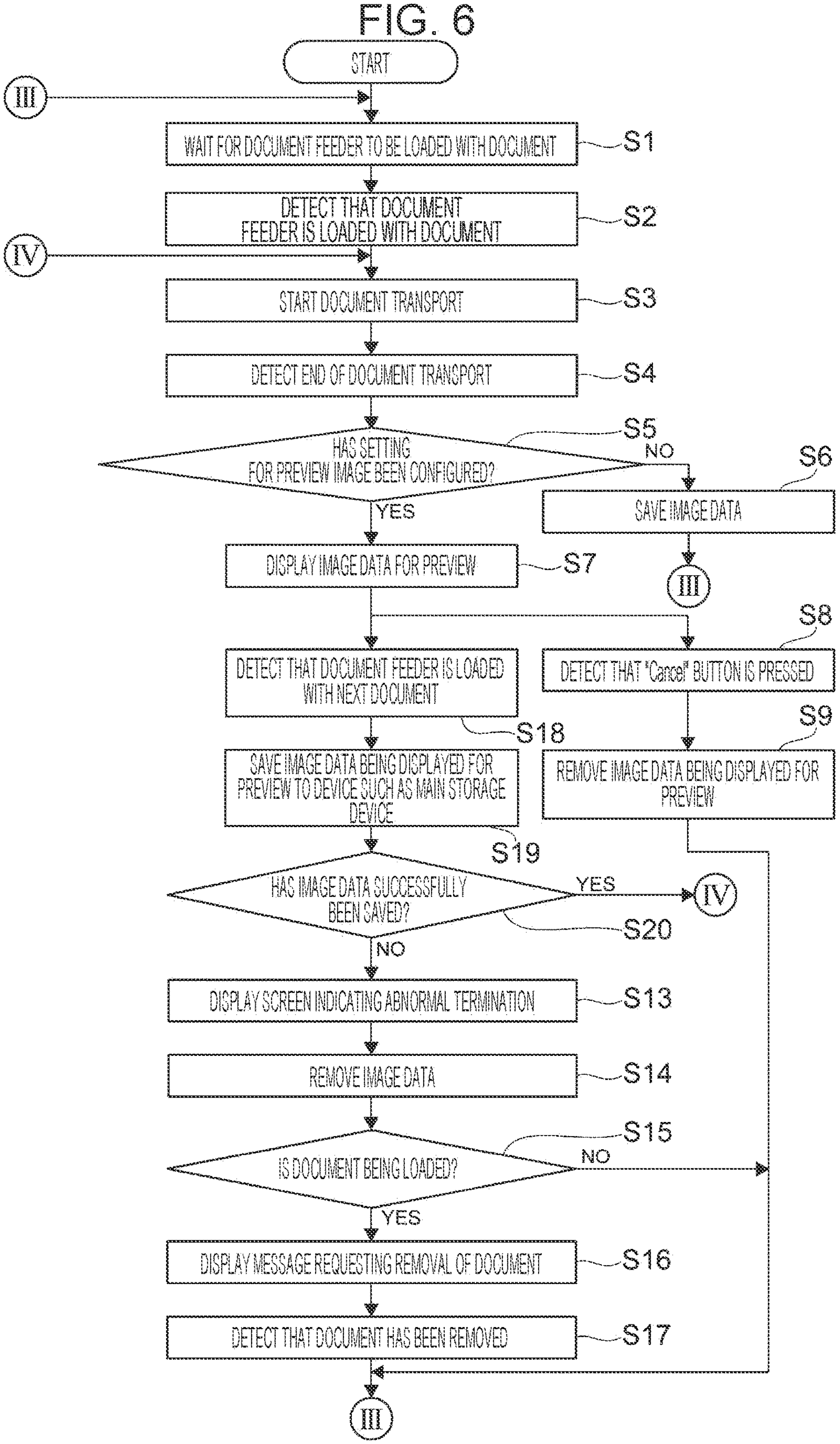
FIG. 6 is a flowchart for describing a processing operation of a scan function performed by an image processing system according to the second exemplary embodiment.

FIG. 6 is a flowchart for describing a processing operation of the scan function performed by an image processing system 1 according to the second exemplary embodiment. Each procedure in FIG. 6 having a corresponding procedure in FIG. 2 is denoted by the same numeral as in FIG. 2.

The flowchart depicted in FIG. 6 is the same as the flowchart depicted in FIG. 2 except that steps 10 to 12 in FIG. 2 are removed.

Third Exemplary Embodiment

In the present exemplary embodiment, description will be given with regard to a case where the image data of the preceding document is saved and the transport of the next document is started in response to the document feeder being loaded with the next document.

Figure 7:
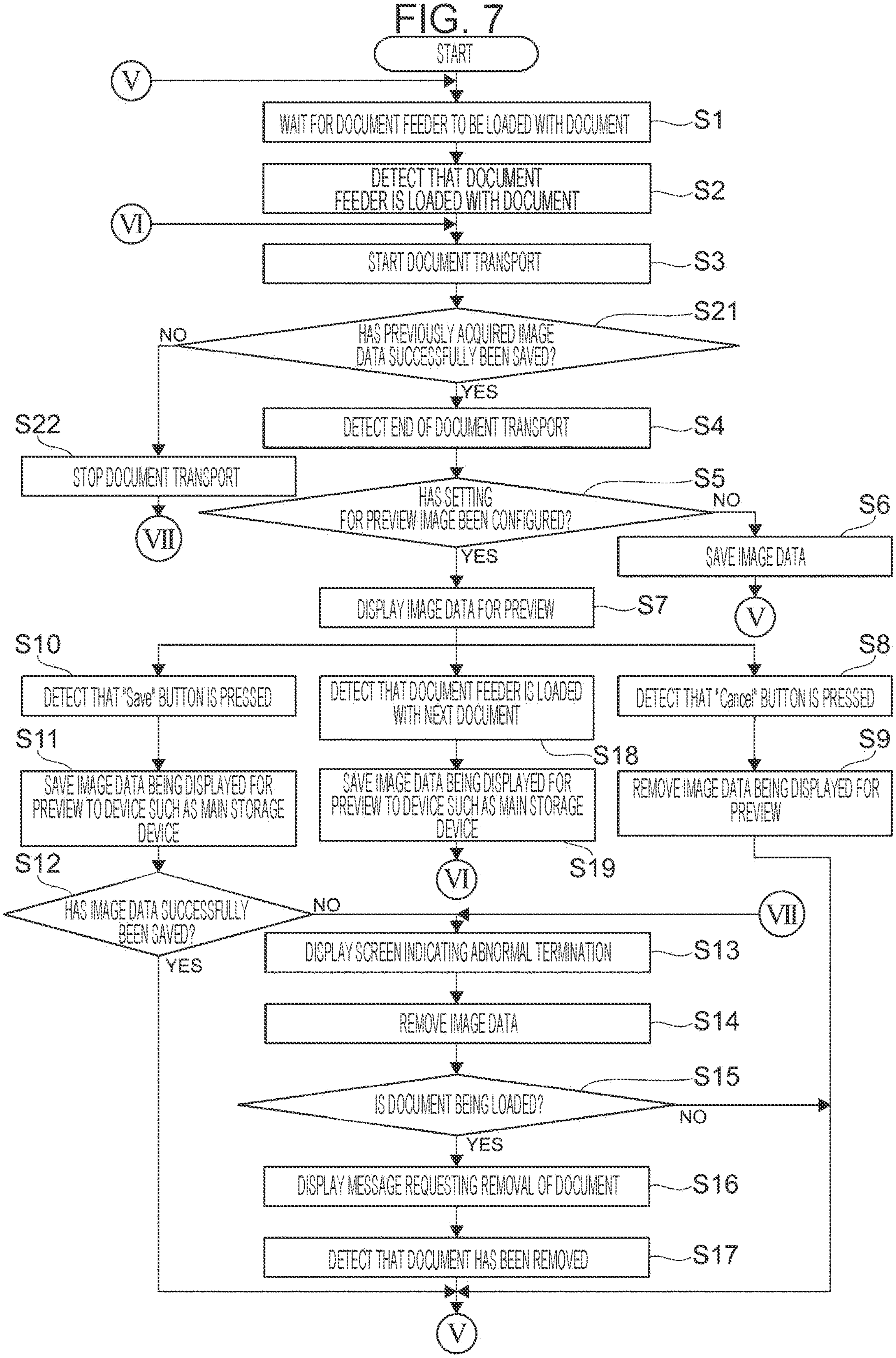
FIG. 7 is a flowchart for describing a processing operation of a scan function performed by an image processing system according to a third exemplary embodiment.

FIG. 7 is a flowchart for describing a processing operation of the scan function performed by an image processing system 1 according to a third exemplary embodiment. Each procedure in FIG. 7 having a corresponding procedure in FIG. 2 is denoted by the same numeral as in FIG. 2.

According to the flowchart depicted in FIG. 7, on detecting that the document feeder is loaded with the next document while a preview image is being displayed (step 18), the processor 11 saves the image data (step 19) and starts to transport the next document (step 3).

In other words, the transport of the next document is started without waiting for the image data to be successfully saved.

However, the previously acquired image data is not necessarily saved successfully.

Thus, after starting the document transport, the processor 11 determines whether the previously acquired image data has successfully been saved (step 21).

The term "the previously acquired image data" indicates the image data being displayed for preview until immediately before the document transport.

If the image data is saved in response to the "Save" button 152C (refer to FIG. 3) being pressed, the transport of the next document is not started unless it is determined in step 12 that the image data has successfully been saved.

Thus, the determination in step 21 is, in effect, made based on whether the image data has successfully been saved when the document feeder is loaded with the next document.

If the image data has successfully been saved, an affirmative determination is made in step 21. In such a case, the processor 11 proceeds to step 4. The determination in step 21 may be made after the execution of step 4.

In contrast, if the image data has not successfully been saved, a negative determination is made in step 21. In such a case, the processor 11 stops the document transport (step 22) and transitions to step 13.

Other Exemplary Embodiments (1) The exemplary embodiments of the present disclosure have been described as above, but the technical scope of the present disclosure is not limited to the range described in the exemplary embodiments above. It is apparent from the description in the claims that various modifications and improvements made to the exemplary embodiments described above do not depart from the technical scope of the present disclosure.

(2) In the exemplary embodiments described above, description has been given with regard to a case where the guidance message 152A is displayed in the operation screen regarding the scan function, but the guidance message 152A may be omitted in the operation screen.

Figure 8:
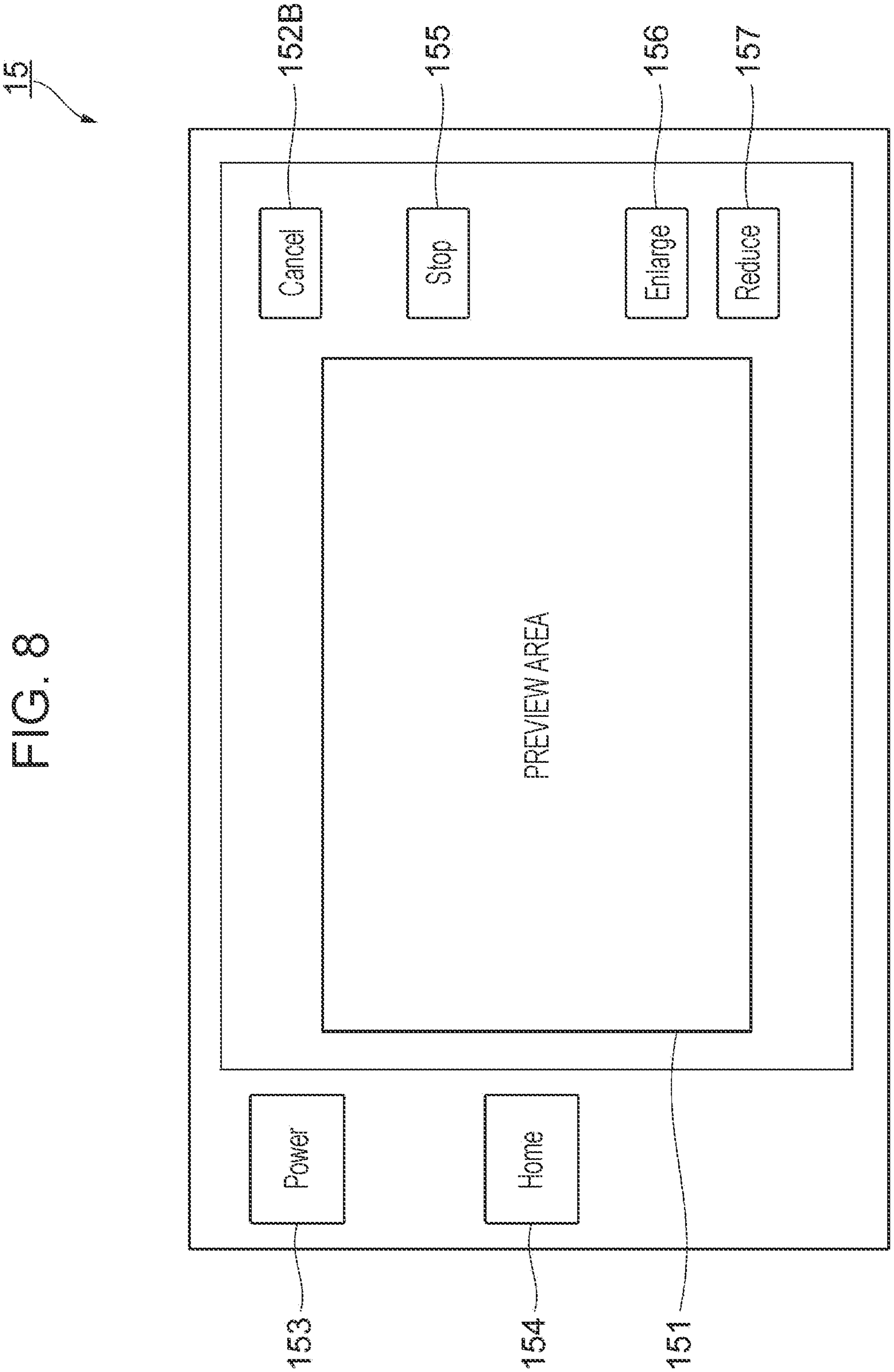
FIG. 8 depicts another example of a preview image.

FIG. 8 depicts another example of a preview image. Each component in FIG. 8 having a corresponding component in FIG. 3 is denoted by the same numeral as in FIG. 3.

The preview image depicted in FIG. 8 is displayed when the setting has disabled the display of the guidance message 152A as well as when the operation screen is provided without the guidance message 152A.

(3) In the exemplary embodiments described above, it is assumed that the document feeder is manually loaded with a document containing one sheet as a scanning block, but the document feeder may manually be loaded with a document containing multiple sheets as a scanning block. For example, the image input device 16 (refer to FIG. 1) may be equipped with an automatic document feeder (ADF), and the ADF may be loaded with a document containing 10 sheets of A4 size. In such a case, the image input device 16 sequentially pulls out sheets one by one from the 10-sheet document loaded in or on the document tray, transports each sheet to the scanning position, acquires image data of all the sheets contained in the 10-sheet document, and displays the image data for preview. The image data is saved as a block containing image data of the 10 sheets.

(4) In the exemplary embodiments described above, it is assumed that the image input device 16 scans in a document on one side to acquire an image, but images of the front surface and the back surface of the document may simultaneously be scanned in while the document is transported in one direction.

(5) In the exemplary embodiments described above, it is assumed that the image processing system 1 (refer to FIG. 1) includes the image output device 18 (refer to FIG. 1), but a system configuration without the image output device 18 is also possible. In other words, the image processing system 1 may be a so-called scanner.

(6) In the exemplary embodiments described above, the description has been given with regard to a case where the processor 11 (refer to FIG. 1) disposed in the same housing as the image processing system 1 (refer to FIG. 1) performs the processing operation regarding the scan function, which is described, for example, with reference to FIG. 2, but a processor in an external apparatus connected via the network may perform the processing operation regarding the scan function.

(7) In the exemplary embodiments described above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments described above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing system comprising: one or more processors configured to: in an operation mode of causing a display device to display, for preview, image data acquired by scanning in a first document during transport by a transport mechanism, while the first document is previewed, save the image data being displayed for preview to a recording medium in response to detection of a document feeder of the transport mechanism being loaded with a second document.

(((2)))

The image processing system according to (((1))), wherein the one or more processors are configured to instruct the transport mechanism to transport the second document in response to the detection.

(((3)))

The image processing system according to (((1))), wherein the one or more processors are configured to instruct the transport mechanism to transport the second document in response to the detection if the image data has successfully been saved to the recording medium.

(((4)))

The image processing system according to (((2))) or (((3))), wherein the one or more processors are configured to cause the display device to display, for preview, image data acquired by scanning in the second document during transport.

(((5)))

The image processing system according to (((3))), wherein the one or more processors are configured not to instruct the transport mechanism to transport the second document if the image data has failed to be saved to the recording medium.

(((6)))

The image processing system according to (((5))), wherein the one or more processors are configured to cause the display device to present a notice requiring a user to unload the second document loaded in or on the document feeder.

(((7)))

The image processing system according to (((5))), wherein the one or more processors are configured to cause the display device to present a notice reporting that the image data that has been displayed for preview is not saved to the recording medium.

(((8)))

The image processing system according to any one of (((1))) to (((7))), wherein the one or more processors are configured to cause the display device to present, while the image data is being displayed by the display device for preview, a notice reporting that loading the document feeder with the second document prompts saving of the image data to the recording medium.

(((9)))

The image processing system according to (((8))), wherein the one or more processors are configured to cause the display device to present a button for instructing that the image data be saved to the recording medium.

(((10)))

The image processing system according to (((8))), wherein the one or more processors are configured to cause the display device to present, while the image data is being displayed by the display device for preview, a notice reporting that loading the document feeder with the second document prompts transport of the second document.

(((11)))

A program causing a computer to execute a process, the process comprising: in an operation mode of causing a display device to display, for preview, image data acquired by scanning in a first document during transport by a transport mechanism, while the first document is previewed, saving the image data being displayed for preview to a recording medium in response to detection of a document feeder of the transport mechanism being loaded with a second document.

What is claimed is:

1. An image processing system comprising:

one or more processors configured to:

in an operation mode of causing a display device to display, for preview, image data acquired by scanning in a first document during transport by a transport mechanism, detect, while the first document is previewed, that a document feeder of the transport mechanism is loaded with a second document, and in response to the detection of the document feeder of the transport mechanism being loaded with the second document, save the image data of the first document to a recording medium.

2. The image processing system according to claim 1, wherein the one or more processors are configured to:

instruct the transport mechanism to transport the second document in response to the detection.

3. The image processing system according to claim 2, wherein the one or more processors are configured to:

cause the display device to display, for preview, image data acquired by scanning in the second document during transport.

4. The image processing system according to claim 1, wherein the one or more processors are configured to:

instruct the transport mechanism to transport the second document in response to the detection if the image data of the first document has successfully been saved to the recording medium.

5. The image processing system according to claim 4, wherein the one or more processors are configured to:

cause the display device to display, for preview, image data acquired by scanning in the second document during transport.

6. The image processing system according to claim 4, wherein the one or more processors are configured not to:

instruct the transport mechanism to transport the second document if the image data of the first document has failed to be saved to the recording medium.

7. The image processing system according to claim 6, wherein the one or more processors are configured to:

cause the display device to present a notice requiring a user to unload the second document loaded in or on the document feeder.

8. The image processing system according to claim 6, wherein the one or more processors are configured to: cause the display device to present a notice reporting that the image data of the first document that has been displayed for preview is not saved to the recording medium.

9. The image processing system according to claim 1, wherein the one or more processors are configured to: cause the display device to present, while the image data is being displayed by the display device for preview, a notice reporting that loading the document feeder with the second document prompts saving of the image data to the recording medium.

10. The image processing system according to claim 9, wherein the one or more processors are configured to: cause the display device to present a button for instructing that the image data be saved to the recording medium.

11. The image processing system according to claim 9, wherein the one or more processors are configured to: cause the display device to present, while the image data is being displayed by the display device for preview, a notice reporting that loading the document feeder with the second document prompts transport of the second document.

12. A non-transitory computer readable medium storing a program causing a computer to execute a process, the process comprising:

in an operation mode of causing a display device to display, for preview, image data acquired by scanning in a first document during transport by a transport mechanism, detecting, while the first document is previewed, that a document feeder of the transport mechanism is loaded with a second document, and in response to the detection of the document feeder of the transport mechanism being loaded with the second document, saving the image data of the first document to the recording medium.

13. An image processing method comprising:

in an operation mode of causing a display device to display, for preview, image data acquired by scanning in a first document during transport by a transport mechanism, detecting, while the first document is previewed, that a document feeder of the transport mechanism is loaded with a second document, and in response to the detection of the document feeder of the transport mechanism being loaded with the second document, saving the image data of the first document to a recording medium.

* * * * *